(12) United States Patent
Yang et al.

(10) Patent No.: US 10,913,851 B2
(45) Date of Patent: Feb. 9, 2021

(54) POLYMER BLEND COMPOSITION FOR ELECTRONIC COMMUNICATION DEVICES

(71) Applicant: SABIC Global Technologies B.V., Bergen op Zoom (NL)

(72) Inventors: Yuzhen Yang, Evansville, IN (US); Hao Zhou, Newburgh, IN (US); Shreyas Chakravarti, Evansville, IN (US)

(73) Assignee: SHPP Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 15/780,423

(22) PCT Filed: Oct. 19, 2016

(86) PCT No.: PCT/US2016/057733
§ 371 (c)(1),
(2) Date: May 31, 2018

(87) PCT Pub. No.: WO2017/095546
PCT Pub. Date: Jun. 8, 2017

(65) Prior Publication Data
US 2018/0355173 A1 Dec. 13, 2018

Related U.S. Application Data

(60) Provisional application No. 62/262,177, filed on Dec. 2, 2015.

(51) Int. Cl.
| | | |
|---|---|---|
| *C08L 79/08* | (2006.01) |
| *C08L 53/02* | (2006.01) |
| *C08L 67/02* | (2006.01) |
| *C08L 83/10* | (2006.01) |
| *C08L 69/00* | (2006.01) |
| *C08G 77/448* | (2006.01) |

(52) U.S. Cl.
CPC ............. *C08L 79/08* (2013.01); *C08L 53/02* (2013.01); *C08L 67/02* (2013.01); *C08L 69/00* (2013.01); *C08L 69/005* (2013.01); *C08L 83/10* (2013.01); *C08G 77/448* (2013.01); *C08L 2203/206* (2013.01); *C08L 2205/035* (2013.01)

(58) Field of Classification Search
None
See application file for complete search history.

(56) References Cited

U.S. PATENT DOCUMENTS

| | | |
|---|---|---|
| 7,786,246 B2 | 8/2010 | Jansen et al. |
| 2007/0066739 A1 | 3/2007 | Odle et al. |
| 2007/0066765 A1 | 3/2007 | Aneja et al. |
| 2009/0306258 A1* | 12/2009 | Siripurapu ............. C08L 69/00 524/147 |
| 2013/0261202 A1 | 10/2013 | Cao et al. |
| 2014/0228462 A1 | 8/2014 | Narayanan et al. |

FOREIGN PATENT DOCUMENTS

| | | |
|---|---|---|
| CN | 104672820 A | 6/2015 |
| CN | 105073889 A | 11/2015 |
| JP | 2009-508997 A | 3/2009 |
| KR | 2014-0139077 A | 12/2014 |
| WO | WO 2014/144438 A1 | 9/2014 |
| WO | WO 2015106204 A1 * | 7/2015 |

OTHER PUBLICATIONS

International Patent Application No. PCT/US2016/057733; Int'l Search Report and the Written Opinion; dated Jan. 19, 2017; 10 pages.
International Patent Application No. PCT/US2016/057733; Int'l Preliminary Report on Patentability; dated Jun. 14, 2018; 7 pages.

* cited by examiner

*Primary Examiner* — Ana L. Woodward
(74) *Attorney, Agent, or Firm* — BakerHostetler

(57) ABSTRACT

Compositions formed from a blend of polyetherimide, siloxane/bisphenol-A polyester/polycarbonate copolymer, polycyclohexylenedimethylene terephthalate, polycarbonate/siloxane copolymer, and styrene-ethylene-butadiene-styrene are disclosed that provide superior performance in terms of notched Izod impact, glass transition temperature (Tg), strength after aging, ability to withstand secondary processing conditions, and in other respects. Such compositions exceed critical-to-quality requirements for use in manufacturing components for electronic communication devices.

22 Claims, No Drawings

POLYMER BLEND COMPOSITION FOR ELECTRONIC COMMUNICATION DEVICES

CROSS-REFERENCE TO RELATED APPLICATION

This application is the National Stage of International Application No. PCT/US2016/057733, filed Oct. 19, 2016, which claims the benefit of U.S. Provisional Application No. 62/262,177 filed Dec. 2, 2015, the disclosures of which are incorporated herein by this reference in their entireties.

TECHNICAL FIELD

The present disclosure relates to polymer blend compositions that are compatible with devices that engage in electronic communication.

BACKGROUND

Materials for use in constructing electronic communication devices, especially the antenna component, should be able to protect the underlying electronics while permitting signal transmission without significant loss thereof through such materials. Such materials should also possess certain performance characteristics. According to device manufacturers and other end users, the next generation of materials should have a notched Izod impact rating of at least 650 J/m, should be capable of withstanding secondary processing conditions that can include temperatures up to 100° C., and should pass relevant strength-after-aging tests.

The conventional benchmark grade for such uses is made from a blend of polybutylene terephthalate (PBT) and polycarbonate (PC) with glass fiber. However, this material has an impact rating of about 150 J/m and low glass transition (Tg) of 90.2° C., which means that it is incapable of meeting next generation requirements.

Accordingly, there remains a need for compositions that provide high performance in terms of electronic signal transmission, and that also possess the performance characteristics required for use in communications devices.

SUMMARY

Provided herein are polymer blend compositions comprising 15-25% by weight polyetherimide (PEI), 5-20% siloxane/bisphenol-A polyester/polycarbonate copolymer, 5-35% by weight polycyclohexylenedimethylene terephthalate (PCT), 15-45% by weight polycarbonate/siloxane copolymer, and, 1-7% by weight styrene-ethylene-butadiene-styrene (SEBS). Also disclosed are articles, including antennas and antenna devices, that comprise such polymer blend compositions.

The present disclosure also relates to methods for forming a polymer blend composition comprising combining 15-25% by weight polyetherimide (PEI), 5-20% siloxane/bisphenol-A polyester/polycarbonate copolymer, 5-35% by weight polycyclohexylenedimethylene terephthalate (PCT), 15-45% by weight polycarbonate/siloxane copolymer, and, 1-7% by weight styrene-ethylene-butadiene-styrene (SEBS); and, extruding the combination to form the composition. Also provided are articles comprising a polymer blend composition that is formed according to such methods.

DETAILED DESCRIPTION OF ILLUSTRATIVE EMBODIMENTS

It is to be understood that the terminology used herein is for the purpose of describing particular aspects only and is not intended to be limiting. As used in the specification and in the claims, the term "comprising" can include the embodiments "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural equivalents unless the context clearly dictates otherwise. Thus, for example, reference to "a polycarbonate polymer" includes mixtures of two or more polycarbonate polymers.

As used herein, the term "combination" is inclusive of blends, mixtures, alloys, reaction products, and the like.

Ranges can be expressed herein as from one particular value, and/or to another particular value. When such a range is expressed, another aspect includes from the one particular value and/or to the other particular value. Similarly, when values are expressed as approximations, by use of the antecedent "about", it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Disclosed are the components to be used to prepare the compositions of the disclosure as well as the compositions themselves, methods for preparing such compositions, and items made from the compositions. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C—F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight, of a particular element or component in a composition or article, denote the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

As used herein the terms "weight percent," "wt. %," and "wt. %" of a component, which can be used interchangeably, unless specifically stated to the contrary, are based on the total weight of the formulation or composition in which the component is included. For example if a particular element or component in a composition or article is said to have 8% by weight, it is understood that this percentage is relative to a total compositional percentage of 100% by weight.

As used herein, the terms "weight average molecular weight" or "Mw" can be used interchangeably, and are defined by the formula:

$$M_w = \frac{\Sigma N_i M_i^2}{\Sigma N_i M_i},$$

where $M_i$ is the molecular weight of a chain and $N_i$ is the number of chains of that molecular weight. Compared to $M_n$, $M_w$ takes into account the molecular weight of a given chain in determining contributions to the molecular weight average. Thus, the greater the molecular weight of a given chain, the more the chain contributes to the $M_w$. $M_w$ can be determined for polymers, e.g. polycarbonate polymers, by methods well known to a person having ordinary skill in the art using molecular weight standards, e.g. polycarbonate standards or polystyrene standards, preferably certified or traceable molecular weight standards.

All cited patents, patent applications, and other references are incorporated herein by reference in their entirety.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

The present disclosure provides polymer blend compositions comprising 15-25% by weight polyetherimide (PEI), 5-20% siloxane/bisphenol-A polyester/polycarbonate copolymer, 5-35% by weight polycyclohexylenedimethylene terephthalate (PCT), 15-45% by weight polycarbonate/siloxane copolymer, and, 1-7% by weight styrene-ethylene-butadiene-styrene (SEBS).

Conventionally, a blend of polybutylene terephthalate and polycarbonate with glass fibers has represented the benchmark grade material for use in constructing electronic communication devices and components thereof, including antennas. As noted above, however, the conventional blend fails to meet the critical-to-quality standard for next generation uses. The present inventors have surprisingly discovered that compositions formed from a blend of polyetherimide (PEI), siloxane/bisphenol-A polyester/polycarbonate copolymer, polycyclohexylenedimethylene terephthalate (PCT), polycarbonate/siloxane copolymer, and, styrene-ethylene-butadiene-styrene (SEBS) can provide superior performance in terms of notched Izod impact, glass transition temperature (Tg), strength after aging, ability to withstand secondary processing conditions, and in other respects.

Polyetherimide

Polyetherimide (PEI) polymers are amorphous, transparent, high performance materials having a glass transition temperature (Tg) of greater than 180° C. PEIs have high strength, heat resistance, and modulus, and broad chemical resistance. The high reliability and safety benefits afforded by a polyetherimide from its optical transparency, toughness, and heat resistance can be useful in medical applications. The monomer unit of polyetherimide polymers is as follows:

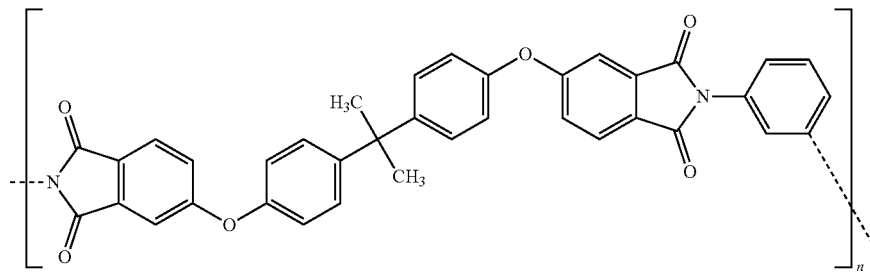

Polyetherimides can include polyetherimides homopolymers (e.g., polyetherimidesulfones) and polyetherimides copolymers. The polyetherimide can be selected from (i) polyetherimidehomopolymers, e.g., polyetherimides, (ii) polyetherimide co-polymers, and (iii) combinations thereof. Polyetherimide polymers are widely commercially available and are sold by SABIC Innovative Plastics (Pittsfield, Mass.) under the ULTEM™, EXTEM™, and Siltem™ brands.

Exemplary products include ULTEM™ Resins, such as the 1000 series ULTEM™ Resins, the 1010 series ULTEM™ Resins, the 1100 series ULTEM™ Resins, the 2100 series ULTEM™ Resins, the 2110 series ULTEM™ Resins, the 2200 series ULTEM™ Resins, the 2210 series ULTEM™ Resins, the 2212 series ULTEM™ Resins, the 2300 series ULTEM™ Resins, the 2310 series ULTEM™ Resins, the 2312 series ULTEM™ Resins, the 2400 series ULTEM™ Resins, the 2410 series ULTEM™ Resins, or any other ULTEM™ type resin. A preferred polyetherimide resin for use as the PEI polymer is ULTEM™ Resin 1010.

Other polyetherimides are described, for example, in U.S. Pub. No. 2014/0228462, the entirety of which is incorporated herein by reference.

The present blend compositions can include 15-25% by weight polyetherimide (PEI). In other aspects, the blend compositions can include 16-24%, 17-23%, 18-22%, 19-21%, about 15%, about 16%, about 17%, about 18%, about 19%, about 20%, about 21%, about 22%, about 23%, about 24%, or about 25% by weight polyetherimide.

Polyetherimides can be of formula (1):

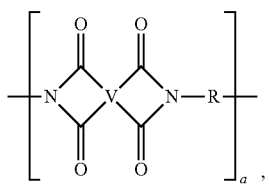
(1)

wherein a is more than 1, for example 10 to 1,000 or more, or more specifically 10 to 500.

The group V in formula (1) is a tetravalent linker containing an ether group (a "polyetherimide" as used herein) or a combination of an ether groups and arylenesulfone groups (a "polyetherimidesulfone"). Such linkers include but are not limited to: (a) substituted or unsubstituted, saturated, unsaturated or aromatic monocyclic and polycyclic groups having 5 to 50 carbon atoms, optionally substituted with ether groups, arylenesulfone groups, or a combination of ether groups and arylenesulfone groups; and (b) substituted or unsubstituted, linear or branched, saturated or unsaturated alkyl groups having 1 to 30 carbon atoms and optionally substituted with ether groups or a combination of ether groups, arylenesulfone groups, and arylenesulfone groups; or combinations comprising at least one of the foregoing. Suitable additional substitutions include, but are not limited to, ethers, amides, esters, and combinations comprising at least one of the foregoing.

The R group in formula (1) includes but is not limited to substituted or unsubstituted divalent organic groups such as: (a) aromatic hydrocarbon groups having 6 to 20 carbon atoms and halogenated derivatives thereof; (b) straight or branched chain alkylene groups having 2 to 20 carbon atoms; (c) cycloalkylene groups having 3 to 20 carbon atoms, or (d) divalent groups of formula (2):

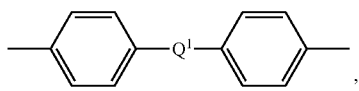
(2)

wherein Q1 includes but is not limited to a divalent moiety such as —O—, —S—, —C(O)—, —SO2—, —SO—, —CyH2y— (y being an integer from 1 to 5), and halogenated derivatives thereof, including perfluoroalkylene groups.

The linker V may include but are not limited to tetravalent aromatic groups of formula (3):

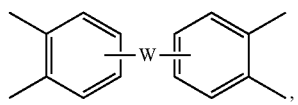
(3)

wherein W is a divalent moiety including —O—, —SO2—, or a group of the formula —O—Z—O— wherein the divalent bonds of the —O— or the —O—Z—O— group are in the 3,3', 3,4', 4,3', or the 4,4' positions, and wherein Z includes, but is not limited, to divalent groups of formulas (4):

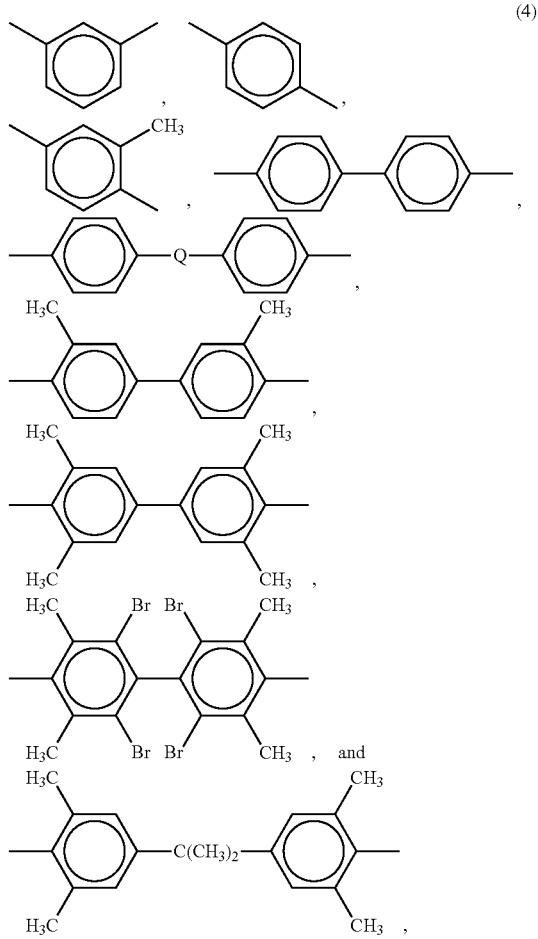
(4)

wherein Q includes, but is not limited to a divalent moiety including —O—, —S—, —C(O), —SO$_2$—, —SO—, —C$_y$H$_{2y}$— (y being an integer from 1 to 5), and halogenated derivatives thereof, including perfluoroalkylene groups.

Polyetherimides may include more than one, specifically 10 to 1,000, or more specifically, 10 to 500 structural units, of formula (5):

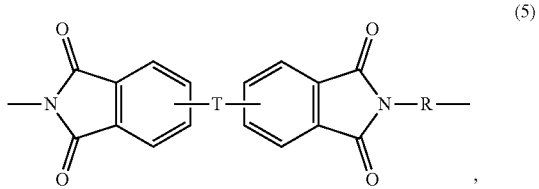

wherein T is —O— or a group of the formula —O—Z—O— wherein the divalent bonds of the —O— or the —O—Z—O— group are in the 3,3', 3,4', 4,3', or the 4,4' positions; Z is a divalent group of formula (3) as defined above; and R is a divalent group of formula (2) as defined above.

Siloxane/Bisphenol-A Polyester/Polycarbonate Copolymer

Polycarbonate and polycarbonate/polysiloxane copolymers may be as specified below. As for the polyester component, the polycarbonate polymer component can comprise copolymers comprising carbonate units and other types of polymer units, including ester units, and combinations comprising at least one of homopolycarbonates and copolycarbonates. An exemplary polycarbonate copolymer of this type is a polyester carbonate, also known as a polyester-polycarbonate.

Polycarbonate Polymer

The present polymer blend compositions can include 0.5 to 55 wt % of polycarbonate polymer. The terms "polycarbonate" or "polycarbonates" as used herein includes copolycarbonates, homopolycarbonates and (co)polyester carbonates.

The term polycarbonate can be, further defined as compositions have repeating structural units of the formula (1):

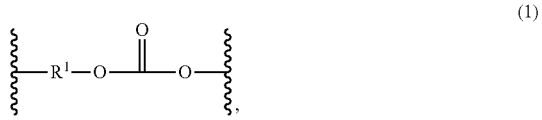

in which at least 60 percent of the total number of $R^1$ groups are aromatic organic radicals and the balance thereof are aliphatic, alicyclic, or aromatic radicals. In a further aspect, each $R^1$ is an aromatic organic radical and, more preferably, a radical of the formula (2):

$$-A^1-Y^1-A^2- \qquad (2)$$

wherein each of $A^1$ and $A^2$ is a monocyclic divalent aryl radical and $Y^1$ is a bridging radical having one or two atoms that separate $A^1$ from $A^2$. In various aspects, one atom separates $A^1$ from $A^2$. For example, radicals of this type include, but are not limited to, radicals such as —O—, —S—, —S(O)—, —S(O$_2$)—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ is preferably a hydrocarbon group or a saturated hydrocarbon group such as methylene, cyclohexylidene, or isopropylidene. Polycarbonate materials include materials disclosed and described in U.S. Pat. No. 7,786,246, which is hereby incorporated by reference in its entirety for the specific purpose of disclosing various polycarbonate compositions and methods for manufacture of the same.

In one aspect, a polycarbonate polymer as disclosed herein can be an aliphatic-diol based polycarbonate. In another aspect, the polycarbonate polymer can comprise a carbonate unit derived from a dihydroxy compound, such as, for example, a bisphenol that differs from the aliphatic diol. In still further aspects, an exemplary polycarbonate polymer includes aromatic polycarbonates conventionally manufactured through a transesterification reaction of an one or more aromatic dihydroxy compound(s) and a carbonic acid diester in the presence of one or more catalyst(s).

In one aspect, non-limiting examples of suitable bisphenol compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 2,2-bis(4-hydroxy-3-bromophenyl)propane, 1,1-bis(hydroxyphenyl) cyclopentane, 1,1-bis(4-hydroxyphenyl)cyclohexane, 1,1-bis(4-hydroxy-3 methylphenyl)cyclohexane 1,1-bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl) sulfide, bis(4-hydroxyphenyl)sulfoxide, bis (4-hydroxyphenyl)sulfone, 9,9-bis(4-hydroxyphenyl) fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy aromatic compounds.

In another aspect, exemplary bisphenol compounds can comprise 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl) phthalimidine, 2-phenyl-3,3-bis(4-hydroxyphenyl) phthalimidine ("PPPBP"), and 9,9-bis(4-hydroxyphenyl) fluorene. Combinations comprising at least one dihydroxy aromatic compound can also be used. In another aspect, other types of diols can be present in the polycarbonate.

In a yet another aspect, polycarbonates with branching groups can be useful, provided that such branching does not significantly adversely affect desired properties of the polycarbonate. Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethylbenzyl) phenol), 4-chloroformyl phthalic anhydride, trimesic acid, and benzophenone tetracarboxylic acid. In one aspect, a branching agent can be added at a level of about 0.05 to about 2.0 wt %. In a still another aspect, mixtures comprising linear polycarbonates and branched polycarbonates can be used.

The polycarbonate polymer can comprise copolymers comprising carbonate units and other types of polymer units, including ester units, and combinations comprising at least one of homopolycarbonates and copolycarbonates. As noted above, an exemplary polycarbonate copolymer of this type is a polyester carbonate, also known as a polyester-polycarbonate. Such copolymers further contain carbonate units derived from oligomeric ester-containing dihydroxy compounds (also referred to herein as hydroxy end-capped oligomeric acrylate esters). In another aspect, the polycarbonate does not comprise a separate polymer such as a polyester. In one aspect, an aliphatic-based polycarbonate comprises aliphatic units that are either aliphatic carbonate units derived from aliphatic diols, or a combination of aliphatic ester units derived from aliphatic diacids having greater than 13 carbons.

Siloxane

In the instant siloxane/bisphenol-A polyester/polycarbonate copolymers, siloxane may be present in the form of a polycarbonate-siloxane copolymer or as a polyester-siloxane copolymer. Alternatively, the siloxane/bisphenol-A polyester/polycarbonate copolymer may include siloxane block, and the siloxane is not part of a polycarbonate-siloxane copolymer or a polyester-siloxane copolymer.

When present, the polycarbonate-polysiloxane copolymer can be a block copolymer comprising one or more polycarbonate blocks and one or more polysiloxane blocks. In certain embodiments, the polycarbonate block can be as described above. Any present polyester-polysiloxane copolymer can be a block copolymer comprising one or more polyester blocks and one or more polysiloxane blocks.

The siloxane blocks, any polycarbonate-siloxane copolymer, or any polyester-siloxane compolymer may comprisen polydiorganosiloxane blocks comprising structural units of the general formula (3) below:

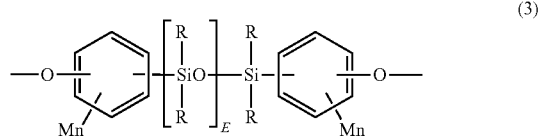

wherein the polydiorganosiloxane block length (E) is from about 20 to about 60; wherein each R group can be the same or different, and is selected from a $C_{1-13}$ monovalent organic group; wherein each M can be the same or different, and is selected from a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, and where each n is independently 0, 1, 2, 3, or 4.

The siloxane/bisphenol-A polyester/polycarbonate copolymer component of the instant polymer blend compositions may be present in an amount from 5-20% by weight. In other aspects, the siloxane/bisphenol-A polyester/polycarbonate copolymer is present in an amount of 7-18%, 8-17%, 8-16%, 8-15%, 9-14%, 9-13%, 9-12%, 10-12%, about 5%, about 6%, about 7%, about 8%, about 9%, about 10%, about 11%, about 12%, about 13%, about 14%, about 15%, about 16%, about 17%, about 18%, about 19%, or about 20% by weight.

Polycyclohexylenedimethylene Terephthalate

The presently disclosed polymer blend compositions include polycyclohexylenedimethylene terephthalate (PCT), which is a thermoplastic polyester formed from the polycondensation of terephthalic acid and cyclohexylene dimethanol (CHDM), and has the following formula:

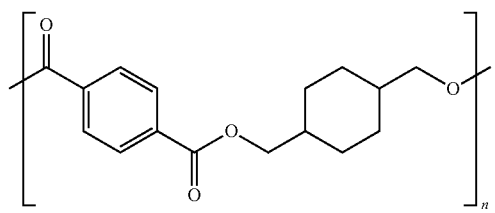

The PCT component may be present in the instant polymer blends in an amount of 5-35% by weight. In other aspects, the PCT is present in an amount of 5-32%, 8-32%, 10-30%, 15-30%, 18-28%, 20-25%, about 5%, about 7%, about 10%, about 12%, about 14%, about 15%, about 17%, about 18%, about 20%, about 23%, about 25%, about 27%, about 28%, about 30%, about 32%, or about 35% by weight.

Polycarbonate-Siloxane Copolymer

As used herein, the term "polycarbonate-siloxane copolymer" is equivalent to polysiloxane-polycarbonate copolymer, polycarbonate-polysiloxane polymer, or polysiloxane-polycarbonate polymer. In various aspects, the polycarbonate-polysiloxane copolymer can be a block copolymer comprising one or more polycarbonate blocks and one or more polysiloxane blocks. In certain embodiments, the polycarbonate block can be as described above. The polysiloxane-polycarbonate copolymer comprises polydiorganosiloxane blocks comprising structural units of the general formula (3) below:

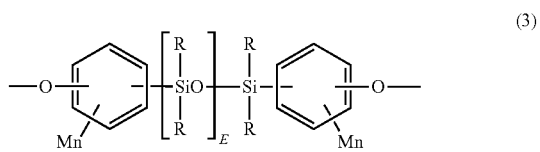

wherein the polydiorganosiloxane block length (E) is from about 20 to about 60; wherein each R group can be the same or different, and is selected from a $C_{1-13}$ monovalent organic group; wherein each M can be the same or different, and is selected from a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, and where each n is independently 0, 1, 2, 3, or 4. The polysiloxane-polycarbonate copolymer also comprises polycarbonate blocks comprising structural units of the general formula (4) below:

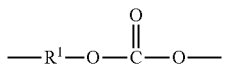

(4)

wherein at least 60 percent of the total number of $R^1$ groups comprise aromatic moieties and the balance thereof comprise aliphatic, alicyclic, or aromatic moieties. Polysiloxane-polycarbonates materials include materials disclosed and described in U.S. Pat. No. 7,786,246, which is hereby incorporated by reference in its entirety for the specific purpose of disclosing various compositions and methods for manufacture of same. One exemplary polycarbonate-siloxane copolymer is C9030P (General Electric Co.), which contains 20% siloxane segments by weight. A further exemplary polycarbonate-siloxane is C9030T (EXL®-T, General Electric Co.).

The polycarbonate-siloxane copolymer component of the instant polymer blend compositions may be present in an amount from 15-45% by weight. In certain aspects, the polycarbonate-siloxane copolymer is present in an amount from 15-40%, 15-35%, 20-35%, 20-30%, 22-28%, about 15%, about 16%, about 18%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, or about 45% by weight.

Styrene-Ethylene-Butadiene-Styrene

The present polymer blend compositions may include 1-10% by weight styrene-ethylene-butadiene-styrene (SEBS). In certain aspects, SEBS may be present in an amount of 1-9%, 1-8%, 1-7%, 1-6%, 2-5%, 2-4%, about 1%, about 2%, about 3%, about 4%, about 5%, about 6%, about 7%, about 8%, about 9%, or about 10% by weight.

Additional Components

The composition can include various additives ordinarily incorporated into polymer compositions of this type, with the proviso that the additive(s) are selected so as to not significantly adversely affect the desired properties of the thermoplastic composition (good compatibility for example). Such additives can be mixed at a suitable time during the mixing of the components for forming the composition.

The additive composition can include a chain extender, flow modifier, antioxidant, heat stabilizer, light stabilizer, ultraviolet (UV) light stabilizer, UV absorbing additive, UV reflectant, plasticizer, lubricant, release agent (such as a mold release agent), antistatic agent, anti-fog agent, quenching agent (e.g., transesterification quenching agent), corrosion inhibitor, antimicrobial agent, colorant (e.g., a dye or pigment), surface effect additive, radiation stabilizer, flame retardant, anti-drip agent, a further impact modifier (i.e., in addition to the SEBS component), filler, or a combination comprising one or more of the foregoing. For example, the combination of a heat stabilizer, impact modifier, ultraviolet light absorber, and a filler can be used as the additives in the instant polymer blend compositions. In general, the additives are used in the amounts generally known to be effective. For example, the total amount of all of the additives in the polymer blend composition can be 0.001 to 20 wt % based on the total weight of the composition.

Heat stabilizer additives include organophosphites (e.g. triphenyl phosphite, tris-(2,6-dimethylphenyl)phosphite, tris-(mixed mono- and di-nonylphenyl)phosphite or the like), phosphonates (e.g., dimethylbenzene phosphonate or the like), phosphates (e.g., trimethyl phosphate, or the like), or combinations comprising at least one of the foregoing heat stabilizers. The heat stabilizer can be tris(2,4-di-t-butylphenyl) phosphate available as IRGAPHOS™ 168. Heat stabilizers are generally used in amounts of 0.01 to 5 wt %, such as 0.05 to 2 wt %, 0.05 to 1 wt %, 0.05 to 0.5 wt %, 0.05 to 0.2 wt %, about 0.5 wt %, about 0.75 wt %, about 0.1 wt %, about 0.15 wt %, about 0.2 wt %, about 0.25 wt %, about 0.3 wt %, about 0.35 wt %, about 0.4 wt %, about 0.45 wt %, or about 0.5 wt %, based on the total weight of polymer in the composition.

There is considerable overlap among plasticizers, lubricants, and mold release agents, which include, for example, glycerol tristearate (GTS), phthalic acid esters (e.g., octyl-4,5-epoxy-hexahydrophthalate), tris-(octoxycarbonylethyl) isocyanurate, tristearin, di- or polyfunctional aromatic phosphates (e.g., resorcinol tetraphenyl diphosphate (RDP), the bis(diphenyl) phosphate of hydroquinone and the bis(diphenyl) phosphate of bisphenol A); poly-alpha-olefins; epoxidized soybean oil; silicones, including silicone oils (e.g., poly(dimethyl diphenyl siloxanes); esters, for example, fatty acid esters (e.g., alkyl stearyl esters, such as, methyl stearate, stearyl stearate, and the like), waxes (e.g., beeswax, montan wax, paraffin wax, or the like), or combinations comprising at least one of the foregoing plasticizers, lubricants, and mold release agents. These are generally used in amounts of 0.01 to 5 wt %, based on the total weight of the polymer in the composition.

Light stabilizers, in particular ultraviolet light (UV) absorbing additives, also referred to as UV stabilizers, include hydroxybenzophenones (e.g., 2-hydroxy-4-n-octoxy benzophenone), hydroxybenzotriazines, cyanoacrylates, oxanilides, benzoxazinones (e.g., 2,2'-(1,4-phenylene)bis (4H-3,1-benzoxazin-4-one, commercially available under the trade name CYASORB UV-3638 from Cytec), aryl salicylates, hydroxybenzotriazoles (e.g., 2-(2-hydroxy-5-methylphenyl)benzotriazole, 2-(2-hydroxy-5-tert-octylphenyl)benzotriazole, and 2-(2H-benzotriazol-2-yl)-4-(1,1,3,3-tetramethylbutyl)-phenol, commercially available under the trade name CYASORB 5411 from Cytec) or combinations comprising at least one of the foregoing light stabilizers. The UV stabilizers can be present in an amount of 0.01 to 3 wt %, specifically, 0.1 to 2.5 wt %, 0.5 to 2.5 wt %, 1.0 to 2.5 wt %, 1.5 to 2.5 wt %, about 1 wt %, about 2 wt %, or about 3 wt %, based upon the total weight of polymer in the composition.

Antioxidant additives include organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)] methane; butylated reaction products of para-cresol or dicyclopentadiene; alkylated hydroquinones; hydroxylated thiodiphenyl ethers; alkylidene-bisphenols; benzyl compounds; esters of beta-(3, 5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate; amides of beta-(3,5-di-tert-butyl-4-hydroxyphenyl)-propionic acid, or combinations comprising at least one of the foregoing antioxidants. Antioxidants are used in amounts of 0.01 to 0.1 parts by weight, based on 100 parts by weight of the total composition, excluding any filler.

Useful flame retardants include organic compounds that include phosphorus, bromine, and/or chlorine. Non-brominated and non-chlorinated phosphorus-containing flame retardants can be preferred in certain applications for regulatory reasons, for example organic phosphates and organic compounds containing phosphorus-nitrogen bonds.

Inorganic flame retardants can also be used, for example salts of C1-16 alkyl sulfonate salts such as potassium perfluorobutane sulfonate (Rimar salt), potassium perfluoroctane sulfonate, tetraethylammonium perfluorohexane sulfonate, and potassium diphenylsulfone sulfonate; salts such as $Na_2CO_3$, $K_2CO_3$, $MgCO_3$, $CaCO_3$, and $BaCO_3$, or fluoro-anion complexes such as $Li_3AlF_6$, $BaSiF_6$, $KBF_4$, $K_3AlF_6$, $KAlF_4$, $K_2SiF_6$, and/or $Na_3AlF_6$. When present, inorganic flame retardant salts are present in amounts of 0.01 to 10 parts by weight, more specifically 0.02 to 1 parts by weight, based on 100 parts by weight of the total composition, excluding any filler.

Anti-drip agents can also be used in the composition, for example a fibril forming or non-fibril forming fluoropolymer such as polytetrafluoroethylene (PTFE). The anti-drip agent can be encapsulated by a rigid copolymer, for example styrene-acrylonitrile copolymer (SAN). PTFE encapsulated in SAN is known as TSAN. A TSAN comprises 50 wt % PTFE and 50 wt % SAN, based on the total weight of the encapsulated fluoropolymer. The SAN can comprise, for example, 75 wt % styrene and 25 wt % acrylonitrile based on the total weight of the copolymer. Antidrip agents can be used in amounts of 0.1 to 10 parts by weight, based on 100 parts by weight of the total composition, excluding any filler.

The presently disclosed compositions may include one or more fillers. Fillers include, for example, mica, clay, feldspar, quartz, quartzite, perlite, tripoli, diatomaceous earth, aluminum silicate (mullite), synthetic calcium silicate, fused silica, fumed silica, sand, boron-nitride powder, boron-silicate powder, calcium sulfate, calcium carbonates (such as chalk, limestone, marble, and synthetic precipitated calcium carbonates) talc (including fibrous, modular, needle shaped, and lamellar talc), wollastonite, hollow or solid glass spheres, silicate spheres, cenospheres, aluminosilicate or (armospheres), kaolin, whiskers of silicon carbide, alumina, boron carbide, iron, nickel, or copper, continuous and chopped carbon fibers or glass fibers, molybdenum sulfide, zinc sulfide, barium titanate, barium ferrite, barium sulfate, heavy spar, $TiO_2$, aluminum oxide, magnesium oxide, particulate or fibrous aluminum, bronze, zinc, copper, or nickel, glass flakes, flaked silicon carbide, flaked aluminum diboride, flaked aluminum, steel flakes, natural fillers such as wood flour, fibrous cellulose, cotton, sisal, jute, starch, lignin, ground nut shells, or rice grain husks, reinforcing organic fibrous fillers such as poly(ether ketone), polyimide, polybenzoxazole, poly(phenylene sulfide), polyesters, polyethylene, aromatic polyamides, aromatic polyimides, polyetherimides, polytetrafluoroethylene, and poly(vinyl alcohol), as well combinations comprising at least one of the foregoing fillers or reinforcing agents. The fillers and reinforcing agents can be coated with a layer of metallic material to facilitate conductivity, or surface treated with silanes to improve adhesion and dispersion with the polymer matrix. Certain fillers act as reinforcing agents. Fillers are used in amounts of 1-15 wt %, 5-12 wt %, 5-10 wt %, 7-10 wt %, about 5 wt %, about 6 wt %, about 7 wt %, about 8 wt %, about 9 wt %, about 10 wt %, about 11 wt %, about 12 wt %, about 13 wt %, about 14 wt %, or about 15 wt %, based on the total weight of the composition.

The present polymer blend compositions can include a further impact modifier (i.e., in addition to the SEBS component), if desired. Impact modifiers may be high molecular weight elastomeric materials derived from olefins, monovinyl aromatic monomers, acrylic and methacrylic acids and their ester derivatives, as well as conjugated dienes that are fully or partially hydrogenated. The elastomeric materials can be in the form of homopolymers or copolymers, including random, block, radial block, graft, and core-shell copolymers.

A specific type of impact modifier may be an elastomer-modified graft copolymer comprising (i) an elastomeric (i.e., rubbery) polymer substrate having a Tg less than about 10° C., less than about 0° C., less than about −10° C., or between about −40° C. to −80° C., and (ii) a rigid polymer grafted to the elastomeric polymer substrate. Materials suitable for use as the elastomeric phase include, for example, conjugated diene rubbers, for example polybutadiene and polyisoprene; copolymers of a conjugated diene with less than about 50 wt % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_1$-$C_8$ alkyl(meth)acrylates; elastomeric copolymers of $C_1$-$C_8$ alkyl(meth)acrylates with butadiene and/or styrene; or combinations comprising at least one of the foregoing elastomers. Materials suitable for use as the rigid phase include, for example, monovinyl aromatic monomers such as styrene and alpha-methyl styrene, and monovinylic monomers such as acrylonitrile, acrylic acid, methacrylic acid, and the $C_1$-$C_6$ esters of acrylic acid and methacrylic acid, specifically methyl methacrylate.

Specific impact modifiers include styrene-butadiene-styrene (SBS), styrene-butadiene rubber (SBR), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN). Exemplary elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), styrene-acrylonitrile (SAN), ethylene-acrylic ester-glycidyl methacrylate (e.g., ethylene-ethyl acrylate-glycidyl methacrylate), natural rubber, fluoroelastomers, ethylene-propylene rubber (EPR), ethylene-butene rubber, ethylene-propylene-diene monomer rubber (EPDM), acrylate rubbers, hydrogenated nitrile rubber (HNBR), silicone elastomers, high rubber graft (HRG), and the like. Some suitable impact modifies include PC (polycarbonate)/ABS (such as Cycoloy PC/ABS) and MBS type formulations. A further exemplary impact modifier is Paraloid® EXL®2335 (Dow Chemical Co.), an acrylic core-shell impact modifier. The additional impact modifier may be present in the instant polymer blend compositions in an amount of 1-10 wt %, 2-9 wt %, 3-9 wt %, 5-9 wt %, 6-8 wt %, about 1 wt %, about 2 wt %, about 3 wt %, about 4 wt %, about 5 wt %, about 6 wt %, about 7 wt %, about 8 wt %, about 9 wt %, or about 10 wt %, based on the total weight of the composition.

The present disclosure also relates to methods for forming a polymer blend composition comprising combining 15-25% by weight Polyetherimide (PEI), 5-20% siloxane/bisphenol-A polyester/polycarbonate copolymer, 5-35% by weight polycyclohexylenedimethylene terephthalate (PCT), 15-45% by weight polycarbonate/siloxane copolymer, and, 1-7% by weight styrene-ethylene-butadiene-styrene (SEBS); and, forming the composition from the combination. For example, the composition may be formed by extruding the combination.

The polymer compositions can be formed by techniques known to those skilled in the art. Extrusion and mixing techniques, for example, may be utilized to combine the components of the polymer composition.

The polymer blend compositions of the present disclosure can be blended with the aforementioned ingredients by a variety of methods involving intimate admixing of the materials with any additional additives desired in the formulation. Because of the availability of melt blending equipment in commercial polymer processing facilities, melt processing methods are generally preferred. Illustrative examples of equipment used in such melt processing methods include: co-rotating and counter-rotating extruders, single screw extruders, co-kneaders, disc-pack processors and various other types of extrusion equipment. The temperature of the melt in the present process is preferably minimized in order to avoid excessive degradation of the resins. It is often desirable to maintain the melt temperature between about 230° C. and about 350° C. in the molten resin composition, although higher temperatures can be used provided that the residence time of the resin in the processing equipment is kept short. In some embodiments the melt processed composition exits processing equipment such as an extruder through small exit holes in a die. The resulting strands of molten resin are cooled by passing the strands through a water bath. The cooled strands can be chopped into small pellets for packaging and further handling.

Compositions can be manufactured by various methods, including batch or continuous techniques that employ kneaders, extruders, mixers, and the like. For example, the composition can be formed as a melt blend employing a twin-screw extruder. In some embodiments at least some of the components are added sequentially. For example, the polycarbonate component and the impact modifier component, can be added to the extruder at the feed throat or in feeding sections adjacent to the feed throat, or in feeding sections adjacent to the feed throat, while the flame retardant component can be added to the extruder in a subsequent feeding section downstream. Alternatively, the sequential addition of the components may be accomplished through multiple extrusions. A composition may be made by preextrusion of selected components, such as the polycarbonate component and the impact modifier component to produce a pelletized mixture. A second extrusion can then be employed to combine the preextruded components with the remaining components. The flame retardant component can be added as part of a masterbatch or directly. The extruder can be a two lobe or three lobe twin screw extruder.

The presently disclosed polymer blend compositions may have a glass transition temperature (Tg) that is greater than about 95° C., about 100° C., about 105° C., about 110° C., about 120° C., about 125° C., about 130° C., or about 135° C. In certain embodiments, the compositions may have a Tg of 109-140° C., 115-140° C., 118-121° C., 120-140° C., 124-140° C., 128-140° C., or of about 109, about 115, about 120, about 124, about 126, about 128, or about 140° C.

The compositions may have a notched Izod impact at 23° C. that is greater than about 700, about 725, about 750, about 775, about 800, about 825, about 850, about 875, about 900, about 925, about 950, about 975, or about 1000 J/m. In certain embodiments, the compositions may have a notched Izod impact at 23° C. of 534-1130 J/m, 556-1130 J/m, 724-1130 J/m, 724-909 J/m, 909-1130 J/m, or of about 534 J/m, about 556 J/m, about 724 J/m, about 909 J/m, or about 1130 J/m.

The polymer blend compositions may have a ductility that is greater than 60%, greater than 70%, greater than 75%, greater than 80%, greater than 85%, greater than 90%, greater than 95%, greater than 99%, or that is 100%. In certain embodiments, the compositions have a ductility of 75-100%, 80-100%, 85-100%, 90-100%, 95-100%, 97-100%, 98-100%, or 99-100%, or of about 80%, about 85%, about 90%, about 95%, about 99%, or about 100%. In particular embodiments, the polymer blend compositions have a Tg higher than 110° C., a notched Izod impact at 23° C. that is greater than 750 J/m, and 100% ductility.

The presently disclosed polymer blend compositions may display favorable chemical resistance properties following banana boat sun screen exposure. For example, using a 1% Strain Jig and following banana boat sun screen exposure at 65° C. for three days, the compositions can display greater than 70%, greater than 75%, greater than 80%, greater than 85%, greater than 90%, or about 70%, about 75%, about 80%, about 85%, about 90%, or about 92% tensile elongation at break, without cracking. Using a 1% Strain Jig and following banana boat sun screen exposure at room temperature for five days, the compositions can display greater than 70%, greater than 75%, greater than 80%, greater than 85%, greater than 90%, greater than 95%, greater than 100%, greater than 105%, or greater than 110%, or about 70%, about 75%, about 80%, about 85%, about 90%, about 95%, about 97%, about 100%, about 105%, about 106%, about 110%, or about 113% tensile elongation at break, without cracking.

The present polymer blend compositions also possess favorable dimensional stability. For example, the compositions may display a thickness change of less than 30 microns, less than 25 microns, less than 20 microns, less than 18 microns, less than 17 microns, less than 16 microns, or less than 15 microns following soaking in water at 95° C. for one hour. In one aspect, the present disclosure pertains to articles, for example, that have been shaped, formed, or molded at least in part from the compositions described herein. Also provided are articles comprising a polymer blend composition that is formed according to the presently disclosed methods for forming a polymer blend composition. The instant compositions can be molded into useful shaped articles by a variety of means such as injection molding, extrusion, rotational molding, blow molding and thermoforming to form articles. The compositions described herein can also be made into film and sheet as well as components of laminate systems.

In a further aspect, the article comprising the disclosed compositions may be used in computer and business machine housings such as housings for monitors, handheld electronic device housings such as housings for cell phones, antenna coatings, covers, sheaths, or housings, electrical connectors, and medical devices that utilize electronic communication, or any other device that utilizes wireless electronic communication. Other representative articles that may be fabricated using the disclosed copolymer compositions provided herein include parts for automatic teller machines (ATM); enclosures, computer housings; desk-top computer housings; portable computer housings; lap-top computer housings; palm-held computer housings; monitor housings; printer housings; keyboards; FAX machine housings; copier housings; telephone housings; mobile phone housings; radio sender housings; radio receiver housings; light fixtures; lighting appliances; network interface device housings; and like applications.

Aspects

In various aspects, the present disclosure pertains to and includes at least the following aspects.

Aspect 1. A polymer blend composition comprising: 15-25% by weight polyetherimide (PEI); 5-20% siloxane/bisphenol-A polyester/polycarbonate copolymer; 5-35% by weight polycyclohexylenedimethylene terephthalate (PCT); 15-45% by weight polycarbonate/siloxane copolymer; and, 1-7% by weight styrene-ethylene-butadiene-styrene (SEBS).

Aspect 2. The composition according to aspect 1 comprising 18-22% by weight PEI.

Aspect 3. The composition according to aspect 1 comprising about 20% by weight PEI.

Aspect 4. The composition according to aspect 1 comprising 7-15% by weight siloxane/bisphenol-A polyester/polycarbonate copolymer.

Aspect 5. The composition according to aspect 1 comprising about 11% by weight siloxane/bisphenol-A polyester/polycarbonate copolymer.

Aspect 6. The composition according to aspect 1 comprising 10-30% by weight PCT.

Aspect 7. The composition according to aspect 1 comprising about 25% by weight PCT.

Aspect 8. The composition according to aspect 1 comprising 15-35% by weight polycarbonate/siloxane copolymer.

Aspect 9. The composition according to aspect 1 comprising about 25% by weight polycarbonate/siloxane copolymer.

Aspect 10. The composition according to aspect 1 comprising about 3% by weight SEBS.

Aspect 11. The composition according to any one of aspects 1-10 further comprising an acrylic impact modifier.

Aspect 12. The composition according to any one of aspects 1-11 further comprising an antioxidant, antistatic agent, chain extender, de-molding agent, flow modifier, light stabilizer, lubricant, mold release agent, pigment, quenching agent, heat stabilizer, a ultraviolet light absorber, ultraviolet reflectant substance, and ultraviolet stabilizer, or any combination thereof.

Aspect 13. The composition according to any one of aspects 1-12, wherein the composition possesses an improvement in high temperature environmental stress crack resistance relative to an otherwise identical composition that comprises, in place of the PCT, a component that is formed from a lower % mol cyclohexylene dimethanol than PCT.

Aspect 14. An article comprising the composition according to any one of aspects 1-13.

Aspect 15. The article according to aspect 14, wherein said article is an antenna device, or an antenna coating, cover, or sheath.

Aspect 16. A method for making a polymer blend composition comprising: combining 15-25% by weight polyetherimide (PEI), 5-20% siloxane/bisphenol-A polyester/polycarbonate copolymer, 5-35% by weight polycyclohexylenedimethylene terephthalate (PCT), 15-45% by weight polycarbonate/siloxane copolymer, and 1-7% by weight styrene-ethylene-butadiene-styrene (SEBS); and, extruding said combination to form said composition.

Aspect 17. The method according to aspect 16 comprising combining 18-22% by weight of said PEI, 7-15% by weight of said siloxane/bisphenol-A polyester/polycarbonate copolymer, 10-30% by weight of said PCT, 15-35% by weight of said polycarbonate/siloxane copolymer, and about 3% by weight of said SEBS.

Aspect 18. The method according to aspect 16 comprising combining about 20% by weight of said PEI, about 11% by weight of said siloxane/bisphenol-A polyester/polycarbonate copolymer, about 25% by weight of said PCT, about 25% by weight of said polycarbonate/siloxane copolymer, and about 3% by weight of said SEBS.

Aspect 19. The method according to aspect 18, further comprising combining an acrylic impact modifier with said PEI, said siloxane/bisphenol-A polyester/polycarbonate copolymer, said PCT, said polycarbonate/siloxane copolymer, and said SEBS.

Aspect 20. An article comprising a polymer blend composition that is produced according to the method of any of aspects 16-19.

Aspect 21. The article according to aspect 20, wherein said article is an antenna device, or an antenna coating, cover, or sheath.

Aspect 22. The composition according to any one of aspects 1-13, wherein the composition displays a Tg higher than 110° C., a notched Izod impact at 23° C. that is greater than 750 J/m, and 100% ductility.

Aspect 23. The composition according to any one of aspects 1-13 and 22, wherein the composition displays greater than 80% tensile elongation at break, without cracking, following banana boat sun screen exposure at 65° C. for three days, or following following banana boat sun screen exposure at room temperature for five days.

Aspect 24. The composition according to any one of aspects 1-13, 22, and 23, wherein the composition display a thickness change of less than about 20 microns following soaking in water at 95° C. for one hour.

EXAMPLES

The following examples are set forth so as to provide those of ordinary skill in the art with a complete disclosure and description of how the methods, additives, compositions, and articles claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is expressed in degrees Celsius or Fahrenheit, or is at ambient temperature, and pressure is at or near atmospheric.

Example 1—Comparative Results for Physical and Mechanical Properties Materials and Methods For the data discussed herein the following materials and methods were used. Table 1 describes the components from which the tested polymer blend compositions were made:

TABLE 1

| Item code | Description |
| --- | --- |
| C1150 | ULTEM POLYMER 1010 (PEI) |
| C913420 | FST, DAC-Resorcinol-Siloxane-BPA Polyester-Polycarbonate: 1% D10 9010 24.5M |
| F963190 | Eastman Polyester 13787 (PCT); co-polyester of terephthalic acid with 100% CHDM |
| C961744 | PCTG; co-polyester of terephthalic acid with 80% |

TABLE 1-continued

| Item code | Description |
|---|---|
| C967 | CHDM and 20% ethylene glycol PETG; co-polyester of terephthalic acid with 30% CHDM and 70% ethylene glycol |
| F966701 | TPA-based polyethylene terephthalate (PET) |
| F9684 | PCCD co-polyester poly(1,4-cyclohexylenedimethylene 1,4-cyclohexanedicarboxylate), 4000 poise viscosity |
| C9030T | EXL-T, Transparent PC-Siloxane Copolymer |
| F7570 | ACRYLIC IMPACT MODIFIER |
| F6525 | CYASORB UV-3638 |
| F621082 | Septon 8104 (SEBS) |
| F542 | Phosphite Stabilizer |
| F8260 | Mono Zinc Phosphate |
| R107C | Titanium Oxide |

Blends of PCT and polycarbonate/siloxane copolymer at different ratios, along with fixed amounts of PEI, siloxane/Bisphenol A polyester/polycarbonate copolymer, and SEBS, were studied and compared with the benchmark grade EXTC2204 in terms of Tg, mechanical properties, and banana boat sunscreen aging test (BBSS) aging performance. Also tested were blends containing copolyesters of terephthalic acid with different amounts of cyclohexylenedimethanol (CHDM) were tested (Samples 6-7), as well as blends containing TPA-based PET or PCCD in place of PCT (Samples 8 and 9, respectively). Table 2 shows the formulations that were used for these studies, wherein numbers are shown in terms of percentage by weight.

TABLE 2

| Item description | Experimental Sample | | | | | | | | |
|---|---|---|---|---|---|---|---|---|---|
|  | 1 | 2 | 3 | 4 | 5 | 6 | 7 | 8 | 9 |
| ULTEM POLYMER 1010 | 20 | 20 | 20 | 20 | 20 | 20 | 20 | 20 | 20 |
| FST, DAC-Resorcinol-Siloxane-BPA Polyester-Polycarbonate: 1% D10 9010 24.5M | 11 | 11 | 11 | 11 | 11 | 11 | 11 | 11 | 11 |
| Eastman Polyester 13787 (PCT) - Unfilled Apps | 10 | 15 | 20 | 25 | 30 | — | — | — | — |
| PCTG | — | — | — | — | — | 25 | — | — | — |
| PETG | — | — | — | — | — | — | 25 | — | — |
| TPA-based polyethyelene terephthalate (PET) | — | — | — | — | — | — | — | 25 | — |
| PCCD | — | — | — | — | — | — | — | — | 25 |
| EXL-T, Transparent PC-Siloxane Copolymer | 38.9 | 33.9 | 28.9 | 23.9 | 18.9 | 23.9 | 23.9 | 23.9 | 23.9 |
| ACRYLIC IMPACT MODIFIER | 7 | 7 | 7 | 7 | 7 | 7 | 7 | 7 | 7 |
| CYASORB UV-3638 | 2 | 2 | 2 | 2 | 2 | 2 | 2 | 2 | 2 |
| Septon 8104 (SEBS) | 3 | 3 | 3 | 3 | 3 | 3 | 3 | 3 | 3 |
| Phosphite Stabilizer | 0.1 | 0.1 | 0.1 | 0.1 | 0.1 | 0.1 | 0.1 | 0.1 | 0.1 |
| Titanium Oxide | 8 | 8 | 8 | 8 | 8 | 8 | 8 | 8 | 8 |

Also tested as a control sample was the conventional, benchmark grade composition comprising a blend of 40% by weight polybutyelene terephthalate, 16% by weight polycarbonate, and 30% by weight glass fibers (not shown in Table 2).

Extrusion of the compositions was carried out using a CPP Technology: Lab Lines CL8: 27 mm Twin Screw Extruder, both side and rear fed; 10 Barrel; 40:1 L/D.

To mold the test samples, separate bars for ASTM tensile, Izod, heat deflection temperature (HDT), and flame testing were injection molded on an 80 ton van Dorn molding machine with a set temperature of approximately 285-310° C. The pellets were dried for 3-4 hours at 120° C. in a forced air-circulating oven prior to injection molding. Each type of sample was individually molded. All samples were tested as molded, and there was no annealing.

Melt volume-flow rate (MVR) was tested per ISO 1133 at 300° C. with 5 kg load and 300 s dwell time.

Specific gravity was measured in accordance with ASTM D792.

Notched and un-notched Izod testing were performed on 75 mm×12.5 mm×3.2 mm bars using ASTM method D256 at both 23° C., 0° C., −30° C. using a 5 lbf hammer for notched samples, and 10 lbf hammer for un-notched specimens.

Ductility was measured using a modified procedure according to ASTM D256. This standard involves observing how Izod bars break upon impact with a pendulum, resulting in any one of four possible observations: 1. Complete break; 2. Hinge break; 3. Partial break; 4. No break. To measure ductility, five Izod bar specimens were evaluated for each test group. For a given bar, a "complete break" or "hinge break" indicated an absence of ductility. A bar that undergoes a "partial break" was considered "ductile". Percentage ductility was obtained by calculating the percentage of bars from among the test group that underwent only a partial break. In contrast, impact strength (J/m) represents the average results that were obtained from the five bars tested.

Tensile properties were measured according to ASTM D638 at 23° C. and 5 mm/min speed.

Flexural properties were tested according to ASTM D790 with 3.2 mm thickness specimen and 1.27 mm/min speed.

Heat deflection temperature (HDT) was tested according to ASTM D648 with 1.82 MPa stress on 3.2 mm thickness specimens.

The Dynamic Mechanical Analyzer (DMA) was tested in accordance with ASTM D5026 from 40 to 200° C. on 75 mm×12.5 mm×3.2 mm unnotched Izod bars.

To assess the properties of the compositions following aging, based on customer requirements, the banana boat sunscreen aging test was selected and performed at 65° C. for 72 hr, and at room temperature for 120 hr. Tensile bars (end gated) were molded according to the above-described molding procedure, and three bars were placed into the 1% Strain Jig at specific amount of time depending on the aging temperature. The bars were removed from the oven, wiped clean, and allowed to air dry before tensile testing as described above. The tensile retention properties are reported as a percent differential from the results obtained from an unexposed control sample. Each data point is the average of three samples.

To assess the dimensional stability of the compositions, V0 flame bars were molded at 1.5 mm thickness according to the molding conditions described supra. The bars were cut and immersed in water (95° C.) for 1 hour. The flame bars were then removed from the water, wiped clean, and permitted to air dry before measurement. Images of the flame bars both before and after hot water soaking were obtained by optical microcopy, and the thickness of the respective bars was measured using a micrometer having a precision of 3 μm.

Results

Physical and mechanical properties of the experimental polymer blend compositions (samples 1-9), as compared with those of the control PBT/PC benchmark grade, are shown in Table 3, below.

TABLE 3

| | Unit | Experimental Sample | | | | | | | | | Control |
| | | 1 | 2 | 3 | 4 | 5 | 6 | 7 | 8 | 9 | |
|---|---|---|---|---|---|---|---|---|---|---|---|
| PCT Content | % | 10 | 15 | 20 | 25 | 30 | — | — | — | — | n/a |
| Tg by DMA | ° C. | 128 | 126 | 124 | 118 | 115 | 121 | 120 | 140 | 109 | 90.2 |
| NII @ 23 C. | J/m | 348 | 556 | 909 | 1130 | 534 | 724 | 314 | 101 | 79.4 | 150.4 |
| Ductility | % | 80 | 100 | 100 | 100 | 60 | 100 | 40 | 0 | 0 | 0 |

As shown in Table 3, all of the experimental samples containing PCT, PCTG, and PETG possessed a higher Tg than the 98° C. temperature requirement from the customer's secondary process conditions, whereas the control PBT/PC sampled did not meet this requirement. The samples containing PCT in the amount of 20 wt % or 25 wt %, or containing 25 wt % PCTG, passed the next generation critical-to-quality notched Izod rating of 650 J/m.

Based on the preceding results, samples 3 (containing PCT), 4 (containing PCT), 6 (containing PCTG), and 7 (containing PETG) were selected for evaluation under the BBSS aging test. The results of the BBSS aging test and tensile property retention test are shown in Table 4, below.

TABLE 4

| | | Experimental Sample | | | | |
| Test | Unit | 3 | 4 | 6 | 7 | Control |
|---|---|---|---|---|---|---|
| 1% Strain Jig BBSS 65 C. 3 Days | — | No Crack | No Crack | No Crack | Cracked | No Crack |
| Tensile Strength @ Yield Retention | % | 103 | 103 | 100 | — | 101 |
| Tensile Elongation @ Break | % | 42 | 92 | 18 | — | 90 |

TABLE 4-continued

| | | Experimental Sample | | | | |
| Test | Unit | 3 | 4 | 6 | 7 | Control |
|---|---|---|---|---|---|---|
| Retention 1% Strain Jig BBSS RT 5 Days | MPa | No Crack | No Crack | No Crack | Cracked | No Crack |
| Tensile Strength @ Yield Retention | % | 104 | 99 | 99 | 99 | 112 |
| Tensile Elongation @ Break Retention | % | 34 | 113 | 106 | 168 | 97 |

Table 4 shows that experimental sample 4 displayed the best tensile property retention among all experimental samples, and passed the both BBSS aging tests (65° C./3 days and room temperature/5 days) without cracking. Sample 6 passed the BBSS aging test, but failed to meet the 50% retention requirement for tensile elongation under high temperature aging conditions. The conventional PBT/PC sample also displayed good chemical resistance by passing the BBSS aging test. However, as shown in Table 3, the PBT/PC blend possessed a lower Tg and displayed significantly poorer impact than each of the experimental blends.

Table 5 depicts the results of an evaluation of the dimensional stability of experimental sample 4 and the conventional PBT/PC blend, which revealed that the former possesses superior characteristics:

TABLE 5

| Test | Unit | Experimental Sample 4 | Control |
|---|---|---|---|
| Thickness change after soaking for 1 hr in water (95° C.) | μm | 15 | 70 |

Therefore, the experimental blends showed significantly better performance than the benchmark composition, and meet the critical-to-quality requirements for next generation applications. Interestingly, by testing polymer blend compositions respectively containing PCTG (co-polyester of terephthalic acid with 80% CHDM and 20% ethylene glycol) and PETG (co-polyester of terephthalic acid with 30% CHDM and 70% ethylene glycol) the present inventors found that it is desirable to include more than 80% mol cyclohexylene dimethanol (CHDM) in the alcohol phase in order to obtain the desired improvement in environmental stress crack resistance (ESCR) at room temperature without sacrificing impact properties. At the same time, it appeared that PCT, which includes 100% mol CHDM, is desired in order to obtain the desired improvement in high temperature ESCR.

What is claimed:

1. A polymer blend composition comprising:
   (a) 15-25% by weight polyetherimide (PEI);
   (b) 5-20% siloxane/bisphenol-A polyester/polycarbonate copolymer;
   (c) 5-35% by weight polycyclohexylenedimethylene terephthalate (PCT);
   (d) 15-45% by weight polycarbonate/siloxane copolymer; and
   (e) 1-7% by weight styrene-ethylene-butadiene-styrene (SEBS);
   wherein % by weight is calculated on the basis of the total weight of (a), (b), (c), (d), and (e), wherein a combined weight percent value of all components does not exceed 100 wt %, and
   wherein the composition displays a Tg higher than 110° C. as tested with a Dynamic Mechanical Analyzer.

2. The composition according to claim 1 comprising 18-22% by weight PEI.

3. The composition according to claim 1 comprising about 20% by weight PEI.

4. The composition according to claim 1 comprising 7-15% by weight siloxane/bisphenol-A polyester/polycarbonate copolymer.

5. The composition according to claim 1 comprising about 11% by weight siloxane/bisphenol-A polyester/polycarbonate copolymer.

6. The composition according to claim 1 comprising 10-30% by weight PCT.

7. The composition according to claim 1 comprising about 25% by weight PCT.

8. The composition according to claim 1 comprising 15-35% by weight polycarbonate/siloxane copolymer.

9. The composition according to claim 1 comprising about 25% by weight polycarbonate/siloxane copolymer.

10. The composition according to claim 1 comprising about 3% by weight SEBS.

11. The composition according to claim 1, further comprising an acrylic impact modifier.

12. The composition according to claim 1, further comprising an antioxidant, antistatic agent, chain extender, demolding agent, flow modifier, light stabilizer, lubricant, mold release agent, pigment, quenching agent, heat stabilizer, ultraviolet light absorber, ultraviolet reflectant substance, ultraviolet stabilizer, or any combination thereof.

13. The composition according to claim 1, wherein said composition possesses an improvement in high temperature environmental stress crack resistance relative to an otherwise identical composition that comprises, in place of the PCT, a component that is formed from a lower % mol cyclohexylene dimethanol than PCT having 100% mol cyclohexylene dimethanol.

14. The composition according to claim 1, wherein the composition has a notched Izod impact at 23° C. that is greater than 534 J/m as tested in accordance with ASTM D256.

15. The composition according to claim 1, wherein the composition has a ductility of at least 60% as tested in accordance with ASTM D256.

16. An article comprising the composition according to claim 1.

17. The article according to claim 16, wherein said article is an antenna device, or an antenna coating, cover, or sheath.

18. A method for making a polymer blend composition comprising:
   combining 15-25% by weight polyetherimide (PEI), 5-20% siloxane/bisphenol-A polyester/polycarbonate copolymer, 5-35% by weight polycyclohexylenedimethylene terephthalate (PCT), 15-45% by weight polycarbonate/siloxane copolymer, and 1-7% by weight styrene-ethylene-butadiene-styrene (SEBS); and,
   extruding said combination to form said composition,
   wherein % by weight is calculated on the basis of the total weight of all components,
   wherein a combined weight percent value of all components does not exceed 100 wt %, and
   wherein the composition displays a Tg higher than 110° C. as tested with a Dynamic Mechanical Analyzer.

19. The method according to claim 18 comprising combining 18-22% by weight of said PEI, 7-15% by weight of said siloxane/bisphenol-A polyester/polycarbonate copolymer, 10-30% by weight of said PCT, 15-35% by weight of said polycarbonate/siloxane copolymer, and about 3% by weight of said SEBS.

20. The method according to claim 18 comprising combining about 20% by weight of said PEI, about 11% by weight of said siloxane/bisphenol-A polyester/polycarbonate copolymer, about 25% by weight of said PCT, about 25% by weight of said polycarbonate/siloxane copolymer, and about 3% by weight of said SEBS.

21. The method according to claim 20, further comprising combining an acrylic impact modifier with said PEI, said siloxane/bisphenol-A polyester/polycarbonate copolymer, said PCT, said polycarbonate/siloxane copolymer, and said SEBS.

22. An article comprising a polymer blend composition that is produced according to the method of claim 18.

* * * * *